(12) United States Patent
D'Hulster (10) Patent No.: US 8,869,839 B1
(45) Date of Patent: Oct. 28, 2014

(54) METHOD AND DEVICE FOR REPAIRING PIPING

(75) Inventor: Gerald Scott D'Hulster, Clearwater, FL (US)

(73) Assignee: Perma-Liner Industries, LLC, Clearwater, FL (US)

( * ) Notice: Subject to any disclaimer, the term of this patent is extended or adjusted under 35 U.S.C. 154(b) by 1090 days.

(21) Appl. No.: 12/731,471

(22) Filed: Mar. 25, 2010

(51) Int. Cl.
*F16L 55/16* (2006.01)

(52) U.S. Cl.
USPC .......... 138/98; 138/97; 405/150.1; 405/184.2

(58) Field of Classification Search
USPC .................. 138/97, 98; 405/150.1, 184.2
See application file for complete search history.

(56) References Cited

U.S. PATENT DOCUMENTS

| | | |
|---|---|---|
| 4,009,063 A | 2/1977 | Wood |
| 4,064,211 A | 12/1977 | Wood |
| 4,366,012 A | 12/1982 | Wood |
| 5,598,873 A * | 2/1997 | Kamiyama et al. ............. 138/98 |
| 5,609,439 A * | 3/1997 | Schreiner et al. .......... 405/184.2 |
| 5,765,597 A * | 6/1998 | Kiest et al. ...................... 138/98 |
| 5,927,341 A | 7/1999 | Taylor |
| 5,950,682 A * | 9/1999 | Kiest, Jr. ......................... 138/98 |
| 6,001,212 A * | 12/1999 | Polivka et al. ................. 156/287 |
| 6,039,079 A | 3/2000 | Kiest, Jr. |
| 6,337,114 B1 * | 1/2002 | Wood et al. .................. 428/36.9 |
| 6,482,280 B1 * | 11/2002 | Kiest et al. ....................... 156/87 |
| 6,899,832 B2 * | 5/2005 | Wood ......................... 264/36.17 |
| 7,216,674 B2 | 5/2007 | Manners |
| 7,845,372 B2 * | 12/2010 | Kiest, Jr. .......................... 138/98 |
| 7,987,873 B2 * | 8/2011 | Kiest, Jr. .......................... 138/98 |
| 2005/0211372 A1 * | 9/2005 | Wood ........................... 156/287 |
| 2006/0243337 A1 | 11/2006 | Manners |
| 2007/0001330 A1 * | 1/2007 | Driver et al. ................ 264/36.17 |
| 2007/0261751 A1 * | 11/2007 | Lepola ............................. 138/98 |
| 2008/0245433 A1 * | 10/2008 | Warren ............................ 138/98 |
| 2009/0056823 A1 * | 3/2009 | Kiest, Jr. .......................... 138/98 |
| 2013/0139922 A1 * | 6/2013 | D'Hulster et al. ............... 138/93 |

* cited by examiner

*Primary Examiner* — James Hook
(74) *Attorney, Agent, or Firm* — McKee, Voorhees & Sease (57) ABSTRACT

An device and method for repairing the junction of a main pipe line and a lateral pipe. The device uses a series of independently controlled bladders to adjust the timing and pressure exerted by the bladders on the pipes. The device also uses a liner assembly of resin absorbent material is formed, with a tubular lateral liner connected to a concentric circular main liner. The liner also includes an opening to facilitate loading of the liner in the device. Upon loading the bladders and resin-embedded liner into a train, the device is positioned and the bladders independently inflated, either concurrently or in sequence, installing the liner assembly onto the pipe. Once the resin is cured, the bladder assembly and launcher are removed from the sewer pipe.

14 Claims, 7 Drawing Sheets

METHOD AND DEVICE FOR REPAIRING PIPING

FIELD OF INVENTION

This invention relates to pipeline and duct liners, using what is known as a "cured-in-place" method. More specifically, the invention provides a novel method and device for applying resin-impregnated pipe liner to a main pipeline-branch pipeline juncture.

BACKGROUND OF THE INVENTION

Broken pipes, such as sewer pipe, has traditionally been repaired by excavating the area surrounding the sewer pipe and replacing the damaged section. This is a very expensive and labor intensive solution, and is also an inconvenience to residents living in the area and utilizing roadways overlying the area. An alternative method repairs the pipe in situ, without the site excavation of the traditional method. These "cured-in-place" systems typically utilize a resin coated liner which is inserted into the existing sewer pipe line and fitted against the interior of the sewer pipe. Such methods have been used very successfully for many years, as exemplified by Wood (U.S. Pat. No. 4,009,063); Wood (U.S. Pat. No. 4,064,211); Wood (U.S. Pat. No. 4,366,012); and Taylor (U.S. Pat. No. 5,927,341).

These patent typically envisaged long, straight lengths of main pipes will be lined, but do not address sections containing side or branch pipes. When a lining is applied along a main sewer as described, the tubular structure will cover the lateral connections and these subsequently have to be reopened by the cutting away of coupons of the rigid lining in register with the lateral connections. In many cases it is the connection between the main pipe and branch pipe which causes the greatest problem, as the joint is weak due to the method of initially forming the branch and the difficulty in repairing the joint.

The present invention seeks to provide a method to install cured-in-place liner which addresses the difficulties existing at present.

SUMMARY OF THE INVENTION

The cured-in-place repair method and device allow for an in situ repair. Some repair systems positioned the repair liner using a single-operation bladder, for example the system described by Kiest (U.S. Pat. No. 6,039,079) comprising interconnected main bladder and lateral bladder. Because the lateral bladder and the main bladder are connected, the pressure of the lateral bladder is tied to the pressure in the main bladder.

The present cured-in-place system comprises two independent bladders, a lateral pipe bladder and a main pipe bladder, with two air lines, one for the main bladder and one for the lateral bladder. As damage to the pipes results in weakened pipes, high inflation pressures may result in a "blow out" of the pipe, thereby destroying the remaining pipe body and preventing any in-pipe repair. The pressure exerted by the lateral pipe bladder can be modulated independently of the main pipe bladder, which may be of significant concern in repairing damaged pipes and aging fragile pipes. Thus, the main bladder may provide sufficient pressure to pin the liner ring to the main pipe while the lateral bladder gently deploys into the lateral pipe.

The device for repairing a junction of a main line pipe and a lateral pipe, uses a repair train having a first end and a second end, at least one wall disposed between the first end and second end, an interior lumen defined by the at least one wall and the first end and second end, and an opening in the at least one wall disposed between the first end and second end. The train optionally includes a plurality of shackles on the front of the repair train to allow the train to attach to other devices, such as a robotic tractor.

In specific embodiments of the invention, the train is a tubular structure. A main bladder tube is disposed on the exterior of the repair train. The main bladder tube has a first end and a second end, with a lateral tube opening between the first end and second end. A lateral bladder tube is disposed in the interior of the repair train and adjacent to the lateral tube opening. A main bladder inflation tube and lateral bladder inflation tube are attached to the main pipe bladder and lateral pipe bladder, respectively. The inflation tubes may attach by any means known in the art, such as quick release connectors, screw connectors, a fused inlet, and a valved inlet.

The device may also include a liner, such as a main pipe liner, a lateral pipe liner, or a junction repair liner. The specific embodiments, the junction repair liner includes a tubular structure with a concentric ring attached to one end of the tube. The concentric ring may be fused to the tube. The junction repair liner may also include an opening on the wall of the tube opposite the end having the concentric circle. The liners may include a resin absorbent material, such as felt, fiberglass, non-woven felt, or polyester knitted fabric; and a support material known in the art. Exemplary support materials include polymer coatings, such as polyvinyl chloride, polyurethane, or polypropylene.

The bladders may be made of any known, robust inflatable material such as a reinforced silicone, rubber, urethane scrim, vinyl, polyurethane, XR-5®, XR-3 PW, polyethylene & polypropylene, EPDM, Kevlar®, neoprene, nitrile, nylon, polyester, polyvinylchloride. In specific embodiments, the bladders are tubular bladders, having a non-pressurized interior lumen.

It is preferred that the resin should be of the ambient cure type which means that it will cure with the passage of time, which may be quite short, a matter of an hour or two, so that no external curing initiation means is required. It is of course possible to use resins which require cure initiation such as heat cure resins, light cure, ultrasonic and so on, but when other than ambient cure resin is utilized, extra means must be provided on site for initiating the cure which increases the cost of the process.

The pipe repair method uses a repair device. The repair device has a repair train, having a first end and a second end, at least one wall disposed between the first end and second end, and an interior lumen. In an exemplary embodiment, the train is a shaped as a tube. The train has an opening in at least one wall. A lateral pipe bladder is inserted into the train, adjacent to the opening. A lateral bladder tube inflation tube is then connected to the lateral bladder, permitting a fluid, such as compressed air, to flow into the lateral bladder. A main bladder, with a lateral bladder opening, is then placed on the exterior of the repair train and a main bladder inflation tube attached to the bladder. The device is ready for insertion of the repair liner, which may occur at this point, or just prior to repair. The repair liner is soaked in resin and inserted through the lateral bladder opening and into the lumen of the lateral bladder.

The device is then positioned at the damaged pipe location by means known in the art. In exemplary embodiments, a robot is used to position the repair train. Once in location, the bladders are inflated. Advantageously, the invention allows the main pipe bladder and lateral pipe bladders to be inflated independent of each other. For example, air may be applied through the main bladder inflation tube and subsequently the lateral bladder inflation tube; or air applied through the lateral bladder inflation tube and subsequently the main bladder inflation tube, or are applied concurrently through the main bladder inflation tube and the lateral bladder inflation tube. Furthermore, the pressure of each bladder may be modulated independently of the other bladder.

The inflated later bladder reverts, rolling the liner onto the pipe. The inflated bladders apply pressure on opposite sides of pipe, pressing the liner against the pipe and allowing the resin to cure. The inflation assembly is then deflated, and the lateral bladder inverted into the inside of the repair train. The device, with deflated bladders, are then removed from the lining, now bonded to the pipe junction.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
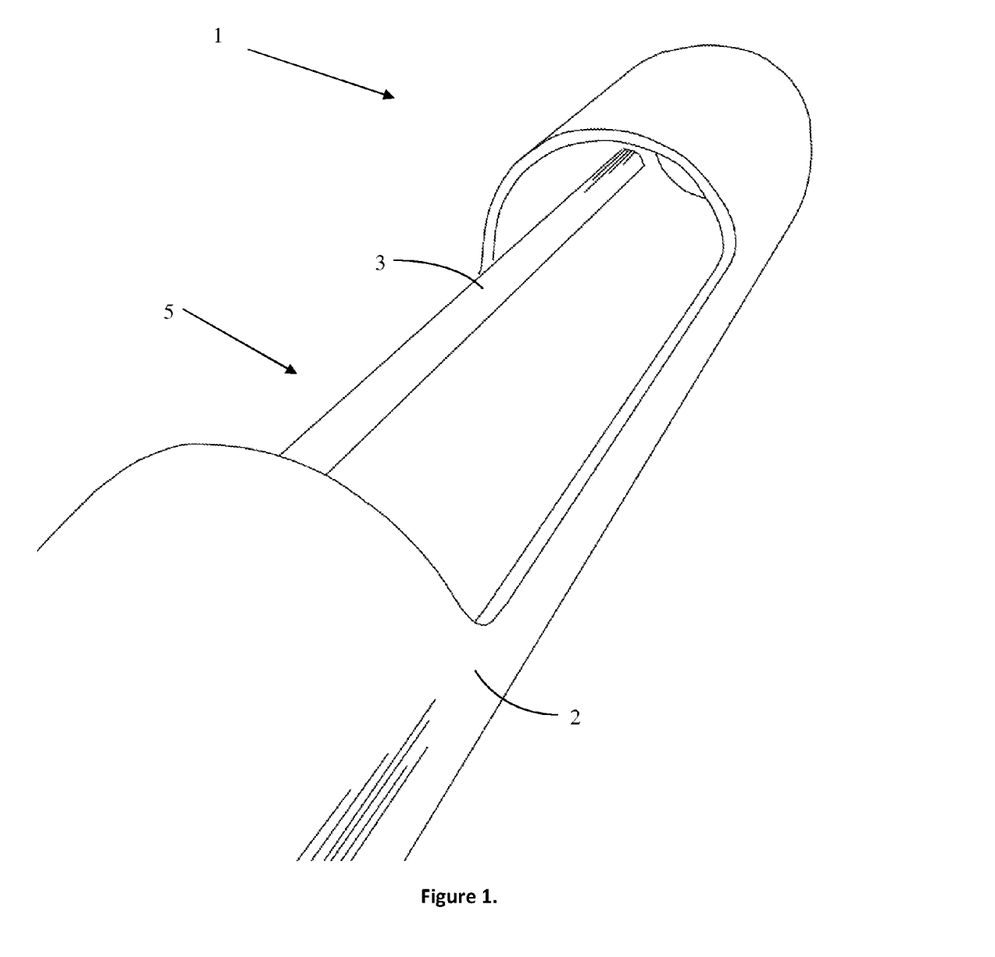
FIG. 1 is an isometric view of the repair train, looking from the front end of the train to the back section.
Figure 2:
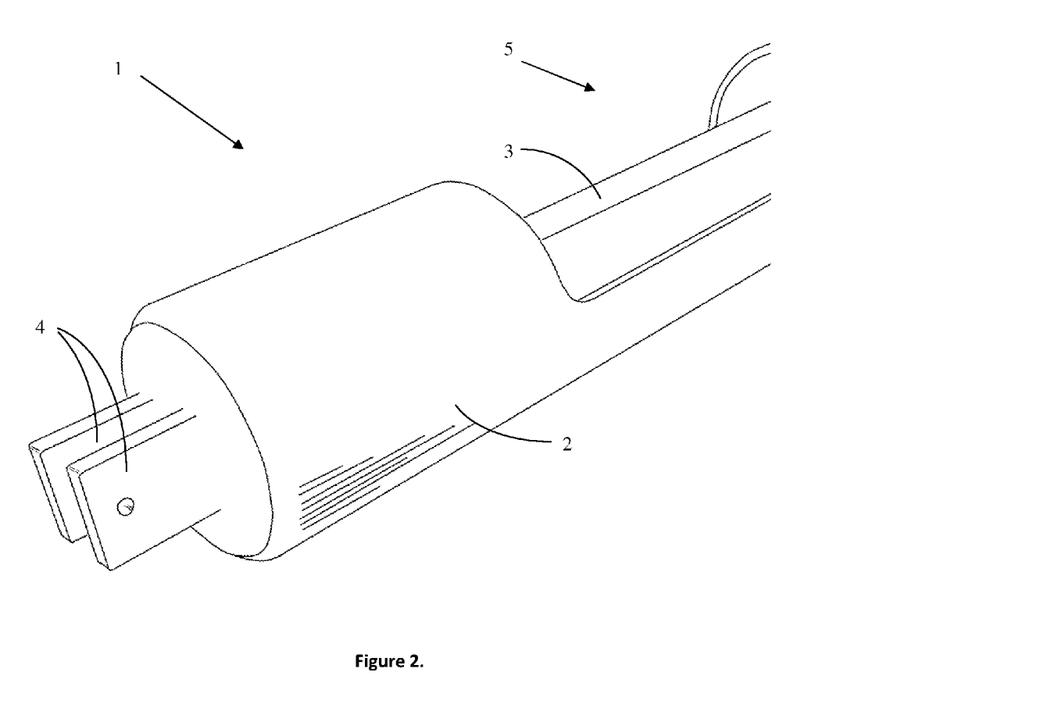
FIG. 2 is an isometric view of the front of the repair train, showing the shackles used to connect the repair train to a robot.

A repair train is used to carry the bladders and resin-coated liner to the pipe repair location. Repair train 1 is a tube having a rectangular inflation opening 5 disposed in the middle of repair train 1, as seen in FIG. 1. Repair train wall 2 provides an interior lumen of the repair train. Accessory tube 3 runs along the length of repair train wall 2 and houses air tubes, cameras, electrical cords, and other accessories, thereby keeping the accessories from entangling the bladders and liners. One end of the repair train is open, while the second end is closed, as seen in FIG. 1. A set up shackles 4 are joined to the second end, allowing a robot to attach to the repair train and carry the device to the repair site, seen in FIG. 2.

Figure 3:
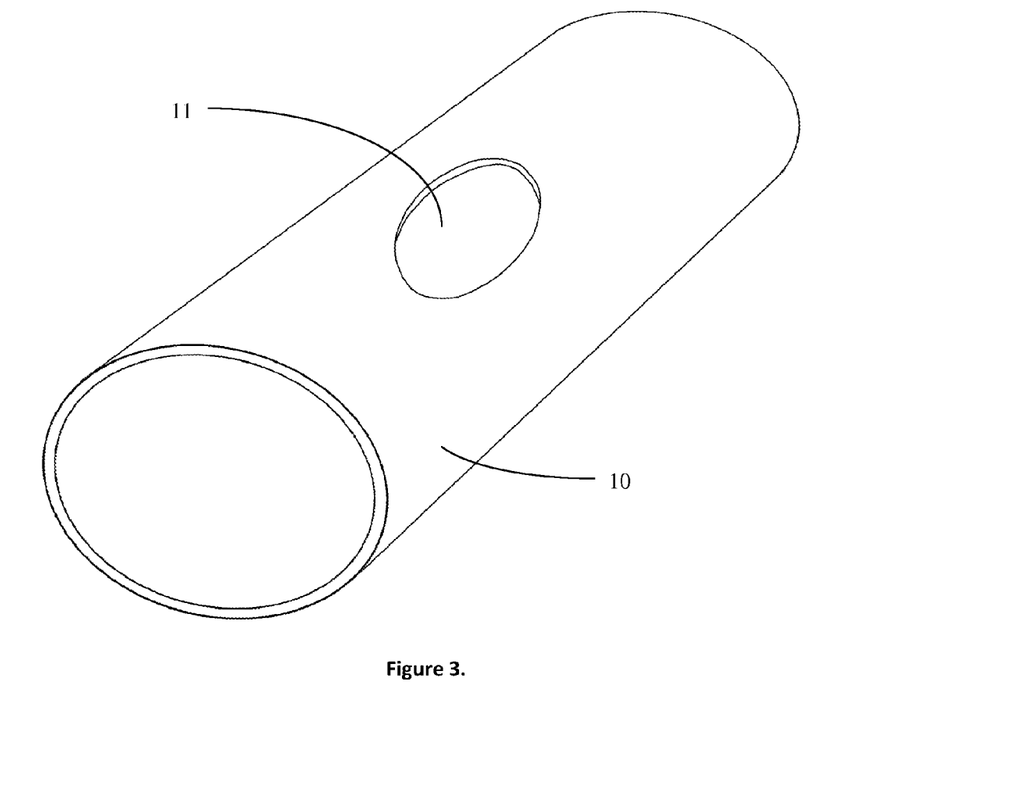
FIG. 3 is an isometric view of the main pipe repair bladder. The lateral pipe opening is visible in the center of the main pipe bladder.

Main pipe bladder 10 is a tubular structure having a circular, lateral tube opening 11 disposed between the two ends of the main pipe bladder, as seen in FIG. 3. Main pipe bladder 10 is of sufficient size to fit snugly around the exterior of repair train wall 2. Main pipe bladder inflation tube 12 has a quick release that locks with a quick release on main pipe bladder 10. Alternatively, main pipe bladder inflation tube 12 is fused with main pipe bladder 10. The main bladder is made from rubber, polyvinyl chloride, polyurethane, polypropylene, or silicon type of materials.

Figure 4:
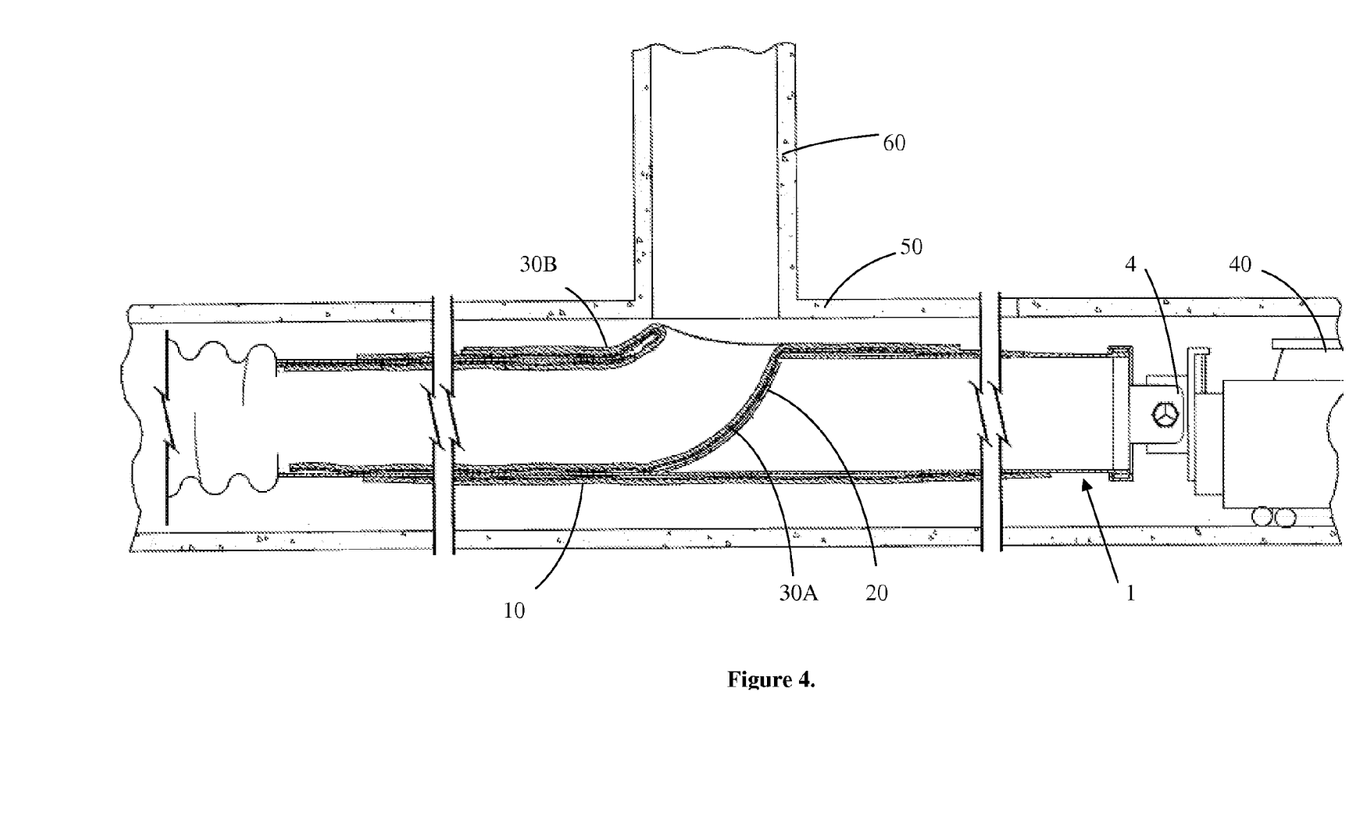
FIG. 4 is a cross-section view of the liner and repair device assembly inserted in a pipe line. The image shows that repair device positioned at a junction for repair.

Lateral pipe bladder 20 is a tubular structure having a first open end 21A and a second closed end 21B, FIG. 4. The lateral pipe bladder is of sufficient diameter and adapted to fit through lateral tube opening 11. Lateral pipe bladder inflation tube 22 connects with the first end of lateral pipe bladder 20 using a quick release or is alternatively fused to the second end of lateral pipe bladder 20. The second end of main pipe bladder inflation tube 12 and second end of the lateral pipe bladder inflation tube 22 each connect to a compressor, or other source of air, such that the main bladder and lateral bladder may be inflated separately.

The device must be assembled prior to use. Second closed end 21B of lateral bladder tube 20 is inverted and placed in the interior lumen of repair train 1. Lateral pipe bladder inflation tube 22 is run through accessory tube 3 and attached to lateral bladder tube 20. Power cables and other accessory lines and cables can be run through accessory tube 3 at this time. Main pipe bladder 10 is slid around the exterior of repair train wall 2, with lateral tube opening 11 disposed over rectangular inflation opening 5. In specific embodiments, lateral bladder tube 20 is attached to main pipe bladder 10, such as by clips, snaps, or other attachment known in the art. Main pipe bladder inflation tube 12 is then slid through accessory tube 3 and attached to main pipe bladder 10. In specific variations, the lateral pipe bladder is band clamped to the interior of repair train wall 2 using rubber sleeves. The rubber sleeves fit between the lateral pipe bladder and the repair train wall to create an air tight fit. Main pipe bladder 10 is positioned over lateral pipe bladder 20 and repair train 1, thereby positioning the opening of lateral pipe bladder 20 adjacent to lateral tube opening 11. Main pipe bladder 10 is secured to repair train wall 2 using banding clamps at each end of the main bladder.

Figure 5:
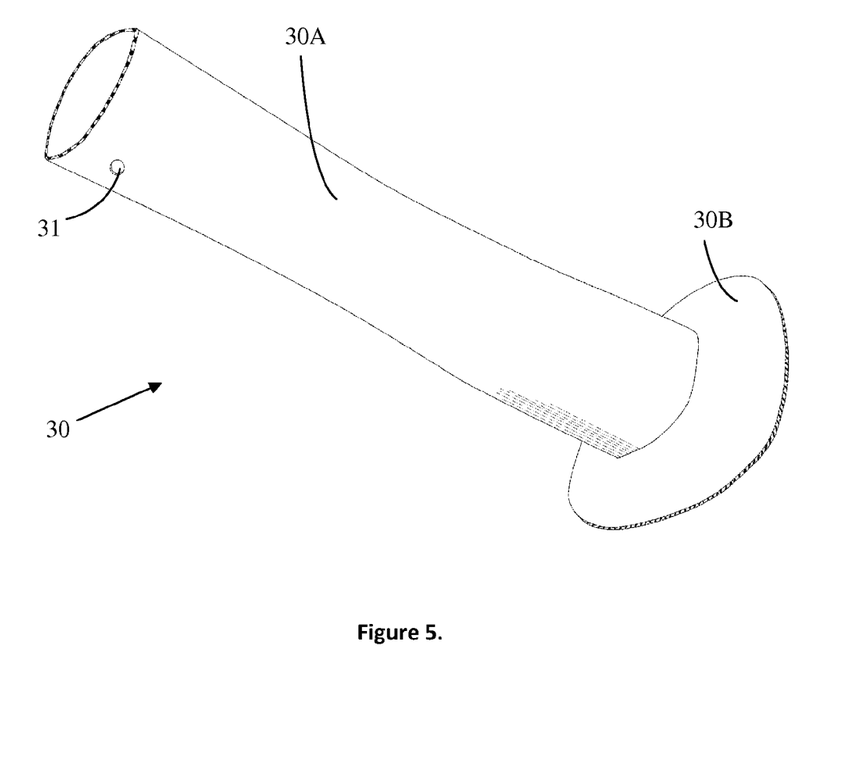
FIG. 5 is an illustration of one embodiment of the liner used in the present invention. The illustrated liner is particularly useful in junction repair, where the main pipe liner covers the area surrounding the junction.

T-shaped liner 30 is made of felt or other resin-absorbent material. In specific variants of the liner, a polymer coating is fused to the exterior of the felt tube. Edges of the liner are sewn together at a seam, and a strip of polymer tape welded over the seam to form an airtight seal. The liner is prepared for insertion into the device. As seen in FIG. 5, the t-shaped liner 30 has a lateral liner subunit 30A with insertion eye 31 disposed on the one end of lateral liner subunit 30A. The second end of the lateral liner subunit is attached to a main liner subunit 30B, such as a ring of liner material. T-shaped liner 30 is soaked in resin. Exemplary resins include polyester, which is useful for sewer applications, vinyl ester, which is useful in industrial, waste, and sewer applications and specifically used for pressurized pipe, and epoxy, which is useful for pressurized and/or high temperature applications. Insertion hook 32 is inserted into insertion eye 31, and the insertion hook is used to slide lateral liner subunit 30A through lateral tube opening 11, and into lateral pipe bladder 20.

Figure 6:
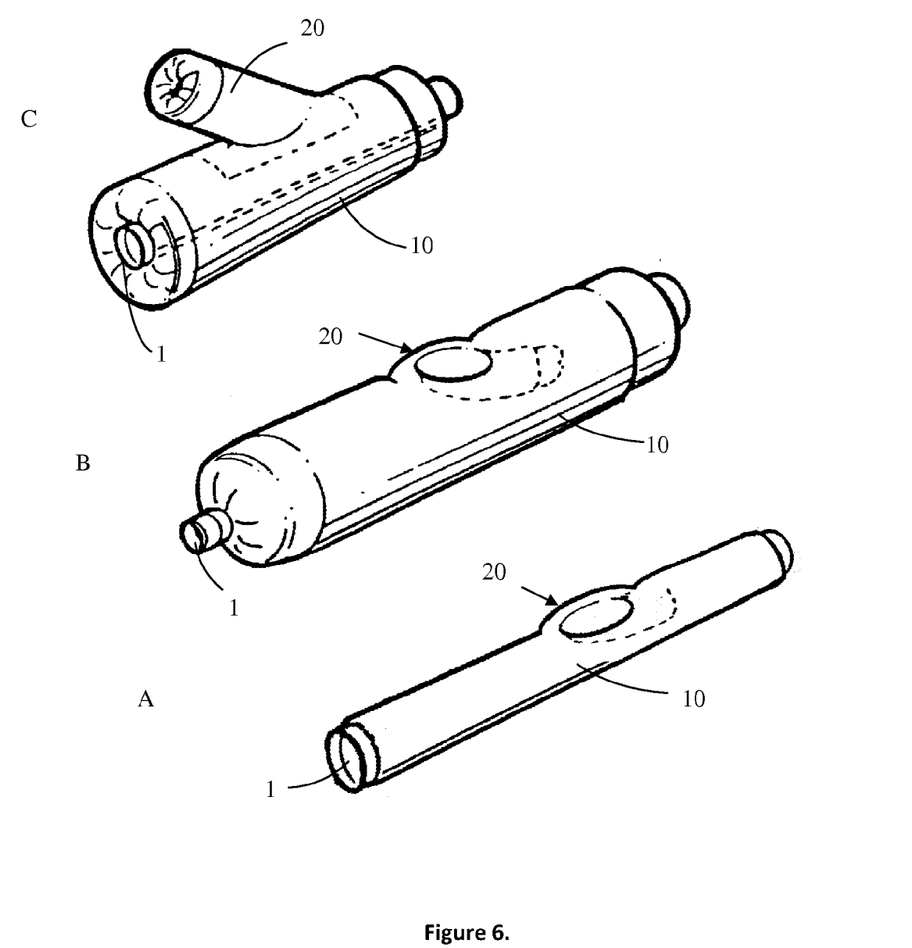
FIGS. 6(A)-(C) are images showing perspective views of the main pipe bladder and lateral pipe bladder being inflated. (A) The bladders are deflated and collected around the repair train. (B) The main pipe bladder has been inflated against the main pipe, with the lateral pipe bladder still deflated. (C) The lateral pipe bladder is inflated, completing the inflation sequence.
Figure 7:
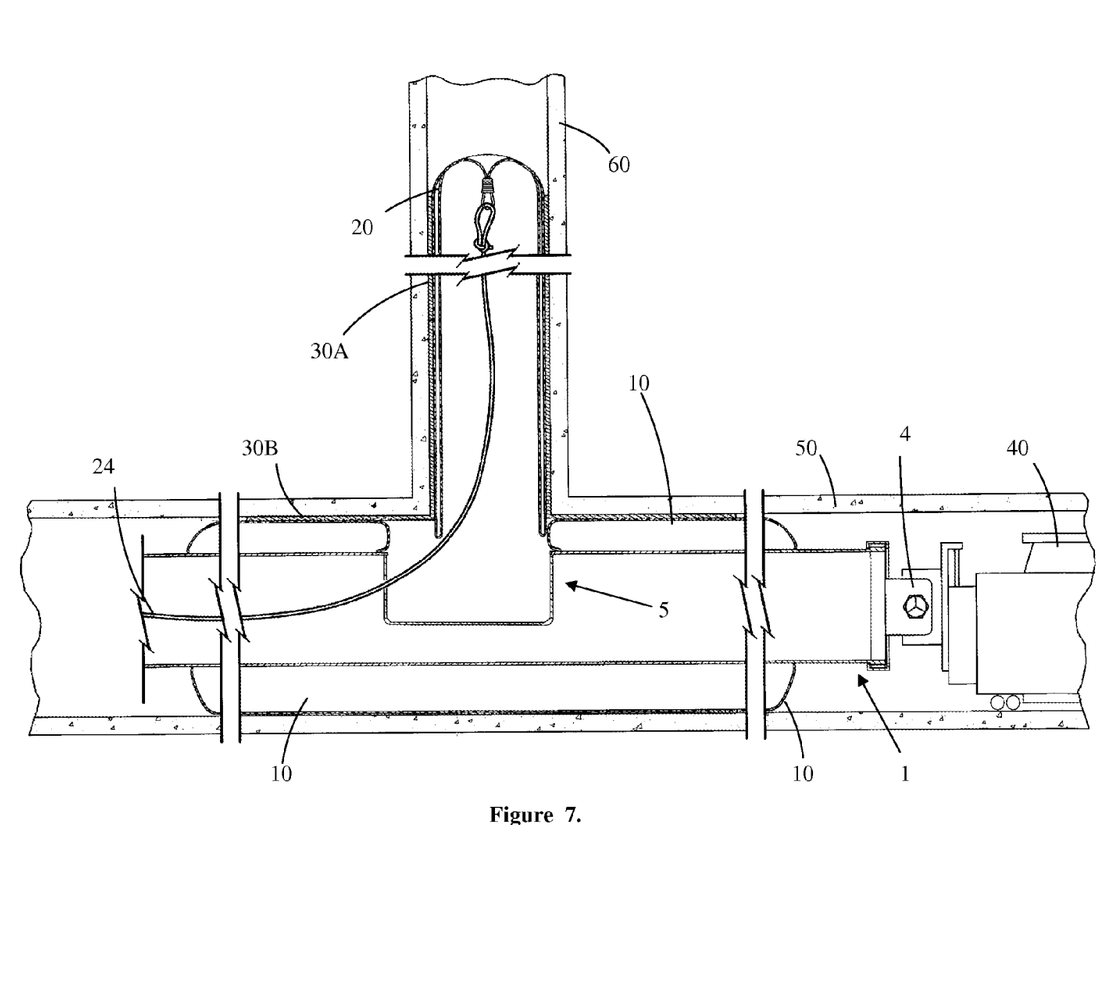
FIG. 7 is a cross-section view of the liner and repair device in the pipe line, with the bladders inflated and the liner applied to the pipe.

A positioning robot 40 is then attached to shackles 4 of repair train 1, as seen in FIG. 4. Accessory lines are attached to the robot and the system introduced into the sewer main line 50, to the damaged pipe. Once at the damaged pipe, the robot positions the repair train such that the lateral liner opening 5 is aligned with lateral pipe 60 and the damaged pipe. Once positioned, air pressure is applied through main pipe bladder inflation tube 12, thereby inflating main pipe bladder 10, seen in FIG. 6. Once the main pipe bladder is inflated against the walls of main pipe 50, air pressure is applied to lateral pipe bladder inflation tube 22, inflating lateral pipe bladder 20. As lateral pipe bladder 20 inflates, the lateral pipe bladder re-verts into the lateral pipe, pressing t-shaped liner 30 against the wall of the lateral pipe, as seen in FIG. 7. While the inflated bladders are shown T-shaped, it is envisioned that main pipe bladder 10 and lateral pipe bladder 20 may also a Y-shape or other shape as needed to accommodate the angle at which the main sewer pipe and lateral sewer pipe are disposed relative to one another.

The air pressure continues to apply pressure against the liner, radially outward against the pipe until the resin in the liner has cured. Once cured, the liner has joined with main pipe 50 and lateral pipe 60 to provide a seal. The air pressure in the bladders is reduced, causing the bladders to deflate. Alternatively, lateral bladder retractor 24 is used to withdraw lateral pipe bladder 20 from lateral pipe 60, facilitating quick removal of the device. The robot is then used to remove the device from the pipe.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a pipe repair device and method of repair, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A method of repairing a junction of a main line pipe and a lateral pipe, comprising:
    providing a repair device comprising a repair train having a first end and a second end, at least one wall disposed between the first end and second end, an interior lumen defined by the at least one wall and the first end and second end, and an opening in the at least one wall disposed between the first end and second end;
    positioning a main bladder on the exterior of the at least one wall of the repair train, wherein the main bladder has a first end and a second end, and a lateral bladder opening disposed between the first end and second end;
    positioning a lateral bladder at least partially in the interior of the repair train and adjacent to the lateral bladder opening, wherein the lateral bladder has a first end and a second end, and wherein the first end being open and attached to the repair train to provide fluid independence from the main bladder;
    connecting a first end of a lateral bladder tube inflation tube having a first end and a second end of the lateral bladder, wherein the first end is in fluid communication with the lateral bladder;
    connecting a first end of a main bladder inflation tube having a first end and a second end to the main bladder, wherein the first end is in fluid communication with the main bladder;
    inserting a repair liner through the lateral bladder opening and into the lumen of the lateral bladder;
    positioning the repair train at a damaged pipe location;
    applying air through the main bladder inflation tube and subsequently the lateral bladder inflation tube to inflate the main bladder tube independently of the lateral bladder tube;
    applying air through the lateral bladder inflation tube and subsequently the main bladder inflation tube, or applying air concurrently through the main bladder inflation tube and the lateral bladder inflation tube to inflate the lateral bladder;
    allowing the resin to cure; and
    removing the repair train and bladders.

2. The method of claim 1, further comprising attaching the repair train to a robotic sled or engine.

3. The method of claim 1, wherein the liner further comprises a tubular member having a first end and a second end, and a wall disposed between the first end and the second end; and
    a concentric ring disposed on the second end of the tubular member.

4. The method of claim 3, further comprising an opening disposed on the wall adjacent to the first end.

5. The method of claim 1, further comprising soaking the repair liner in an uncured resin.

6. A device for repairing a junction of a main line pipe and a lateral pipe, comprising:
    a repair train having a first end and a second end, at least one wall disposed between the first end and second end, an interior lumen defined by the at least one wall and the first end and second end, and an opening in the at least one wall disposed between the first end and second end;
    a main bladder tube disposed on the exterior of the at least one wall, wherein the main bladder tube has a first end and a second end, and a lateral tube opening disposed between the first end and second end;
    a lateral bladder tube disposed at least partially in the interior of the repair train and adjacent to the lateral tube opening, wherein the lateral bladder tube has a first end and a second end, and wherein the first end being open and attached to the repair train to provide fluid independence from the main bladder;
    a main bladder tube inflation tube having a first end and a second end, wherein the first end is in fluid communication with the main bladder tube; and
    a lateral bladder tube inflation tube having a first end and a second end, wherein the first end is in fluid communication with the lateral bladder tube;
    wherein the main and lateral inflation tubes provide independent inflation to the respective main and lateral bladder tubes.

7. The device of claim 6, further comprising a main pipe liner disposed on the exterior of the main bladder.

8. The device of claim 6, further comprising a lateral pipe liner disposed on the interior of the lateral bladder.

9. The device of claim 6, further comprising a plurality of shackles disposed on the first end of the repair train.

10. The device of claim 9, further comprising a robotic tractor in communication with the shackles.

11. The device of claim 6, further comprising a liner, wherein the liner comprises a tubular member having a first end and a second end, and a wall disposed between the first end and the second end; and a concentric ring disposed on the second end of the tubular member.

12. The device of claim 11, further comprising an opening disposed on the wall adjacent to the first end.

13. The device of claim 11, wherein the tubular member and concentric ring further comprise a resin-absorbent material and a support material;

where the resin absorbent material is woven felt, fiberglass, nonwoven felt, or polyester knitted fabric; and where the support material is polymer coating is polyvinyl chloride, polyurethane, or polypropylene.

14. The device of claim 6, wherein the bladders comprise silicone, rubber, urethane scrim, vinyl polyurethane, XR-5°, XR-3 PW, polyethylene, polypropylene, EPDM, Kevlar®, neoprene, nitrile, nylon, polyester, or polyvinylchloride.

* * * * *